Feb. 25, 1964    R. O. OSBORN    3,122,445
TREATING FLUOROCARBON POLYMER FILM WITH
BORON TRIFLUORIDE AND OXYGEN
Filed April 25, 1961
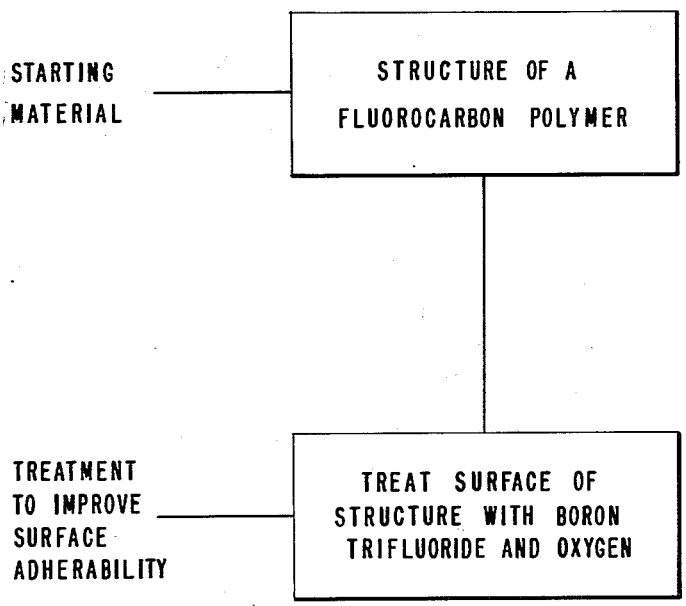
INVENTOR
ROBERT OTTO OSBORN
BY *Herbert M. Wolfson*
ATTORNEY ND United States Patent Office 3,122,445
Patented Feb. 25, 1964

3,122,445
TREATING FLUOROCARBON POLYMER FILM
WITH BORON TRIFLUORIDE AND OXYGEN
Robert Otto Osborn, Buffalo, N.Y., assignor to E. I. du Pont de Nemours and Company, Wilmington, Del., a corporation of Delaware
Filed Apr. 25, 1961, Ser. No. 105,261
20 Claims. (Cl. 117—47)

This invention relates to the manufacture of organic, polymeric, thermoplastic shaped structures, particularly film, and has as its object a process for improving the properties of such structures. A more specific object is to provide self-supporting films and film coatings of organic, thermoplastic polymers which adhere readily to themselves and are permanently receptive to adhesives and coatings of all types, particularly printing inks and the like. Other objects will appear hereinafter. While the invention will be described primarily as a treatment for films, it should be understood that other shaped structures such as sheets, rods, tubes, filaments, etc., may be similarly treated.

The objects are accomplished by a process which comprises treating the surface of the organic, polymeric, thermoplastic shaped structure with boron trifluoride and an oxidizing agent. The boron trifluoride and the oxidizing agent may be applied as part or all of a gaseous mixture; or the boron trifluoride may be applied first, followed by treatment with the oxidizing agent. When the process is carried out sequentially, the boron trifluoride may be employed either in its gaseous form or in the liquid form of an organic coordination complex thereof or as a liquid hydrate of boron trifluoride. The hydrates include $BF_3 \cdot 1 \cdot 2H_2O$ and the like. Boron trifluoride coordinates or complexes with a variety of organic compounds, particularly amines and oxygen-containing compounds such as ethers, alcohols, esters, acids and amides. The complexes of boron trifluoride with diethyl ether, dimethyl ether, methyl ethyl ether, dimethyl formamide and phenol are particularly useful because they are liquids at room temperature. When liquid coordination complexes or the hydrates of boron trifluoride are employed for sequential treatment, slightly elevated temperatures are preferred to increase the rate of dissociation, thus shortening the immersion time necessary to effect a satisfactory degree of treatment.

The amount of boron trifluoride in the total of boron trifluoride and oxidizing agent used, in a gaseous mixture or as part of the sequence treatment, may vary from 0.1% to 98% by volume. The preferred method involves treatment with the gaseous mixture and the subsequent description will be primarly concerned therewith. However, it should be understood that the ensuing information is equally applicable to the aforementioned sequential treatments.

Boron trifluoride, having a normal boiling point of approximately —100° C., is gaseous at ordinary temperatures. The treatment may therefore be performed at any convenient temperature, usually at room temperature, i.e. 20–25° C., or above or below room temperature. At elevated temperature, briefer exposures to atmospheres which may contain lower boron trifluoride concentrations than at room temperature may be employed successfully. Since it is desirable that the film be self-supporting during treatment, the upper limit on the temperature is the temperature at which the film becomes too soft to handle at reasonable speeds, i.e., about 200° C. for most polymeric, thermoplastic films, but as high as 350° C. for some fluorocarbon polymers. However, some polymers may even be treated at temperatures in their softening ranges or above their melting points successfully by the process of this present invention.

The oxidizing agent, which alone or with inert gas comprises the remaining volume of the gaseous mixture, may be selected from a diverse group. Preferably, pure oxygen or oxygen as a component in an air mixture is used. Ozone, chlorine, oxides of nitrogen, vapors of such compounds as peracetic acid, perbenzoic acid and hydrogen peroxide may also be used. The oxidizing agent preferably comprises at least 2% by volume of the gaseous mixture.

The process of the invention is useful for the treatment of self-supporting films and coatings composed of all varieties of organic, thermoplastic, fluorocarbon polymers. Specifically, the process is useful for the treatment of organic, polymeric, thermoplastic shaped structures of a fluorocarbon polymer containing at least 5 mole percent, preferably at least 20 mole percent of recurring structural units depicted by the following structural formula:

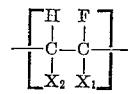

wherein

—$X_1$ is a monovalent radical selected from the group consisting of —H, —F, —Cl and —$CF_3$; and
—$X_2$ is a monovalent radical selected from the group consisting of —H, —F, —$R_1$ and —$R_2$, wherein —$R_1$ is selected from the group consisting of aryl and alkyl having 1 to 8 carbon atoms and —$R_2$ is selected from the group consisting of —O—$R_1$, —$CH_2$—O—$R_1$

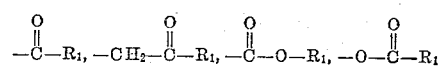

and

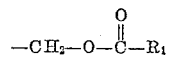

Homopolymers and copolymers of vinyl fluoride and vinylidene fluoride are particularly well suited for treatment by the present invention. Polyvinyl fluoride film, the homopolymer of vinyl fluoride, is a material that has displayed outstanding improvements when treated by the process of the present invention. Polyvinyl fluoride film for treatment may be prepared according to procedures described in U.S. Patents Nos. 2,419,008 and 2,419,010 to Coffman and Ford. However, the fluorocarbon polymers within the aforementioned definition are not limited to polymers of vinyl fluoride and vinylidene fluoride.

The polymers in which may be found recurring structural units within the above definition and which may be successfully treated according to the process of this invention are found in the following three groups:

Group 1—the homopolymers and interpolymers of fluorinated ethylenes such as vinyl fluoride, vinylidene fluoride, 1,2-difluoroethylene, trifluoroethylene, 1-fluoropropylene and 1,1-difluoropropylene;

Group 2—interpolymers of the fluorinated ethylenes of Group 1 with perhalofluorinated ethylenes such as tetrafluoroethylene; hexafluoropropylene and chlorotrifluoroethylene; and Group 3—interpolymers of the fluorinated ethylenes of Group 1 or of the perhalofluorinated ethylenes of Group 2 with monoethylenically unsaturated monomers copolymerizable therewith selected from the following: mono-ethylenic hydrocarbons such as ethylene, propylene, isobutylene, butene-1, butene-2, stilbene and styrene; halogen-substituted mono-ethylenic hydrocarbons such as vinyl chloride, vinyl bromide, 1,1-dichloroethylene, difluorochloroethylene and trifluorochloroethylene; vinyl esters such as vinyl formate, vinyl acetate, vinyl propionate, vinyl butyrate, vinyl benzoate, vinyl pivalate, vinyl stearate, vinyl salicylate and vinyl esters of inorganic acids; vinyl ethers such as vinyl ethyl ether, butyl vinyl ether, methyl allyl ether, tetrafluoroethyl allyl ether, and vinyl dioxolane; vinyl ketones such as methyl vinyl ketone and ethyl allyl ketone; N-vinyl imides such as N-vinyl succinimide and N-vinyl phthalimide; acrylic and methacrylic acids and their derivatives such as their esters, nitriles, amides, anhydrides and acid halides, including methyl methacrylate, ethyl acrylate, betahydroxyethyl methacrylate, allyl methacrylate, acrylonitrile, N-butyl methacrylamide, etc.; derivatives of maleic and fumaric acids such as diethyl maleate and dimethyl fumarate; propenyl esters such as allyl acetate and isopropenyl acetate; and polymers of chlorinated and chlorosulfonated polyethylene. The preferred copolymers are those of vinyl fluoride and vinylidene fluoride in which the aforementioned compounds comprise at least 20% by weight.

For convenience in rendering shaped structures susceptible of treatment according to the process of this invention without resorting to extreme conditions of exposure regarding time, temperature or concentration of boron trifluoride, at least 5 mole percent of the recurring structural units of the polymeric surface should meet the aforementioned structural definition, and preferably at least 20 mole percent. While polymeric surfaces containing a smaller percentage of such recurring units may be successfully treated according to the process of this invention, it has in general been found that for effective treatment, either higher temperatures, longer exposure times or greater concentrations of boron trifluoride or some combination thereof may be required.

Whether treatment according to the process of this invention is accomplished sequentially through the use of a liquid complex of boron trifluoride or simultaneously through the use of a boron trifluoride/air mixture, it has been found advisable to remove any traces of boron trifluoride that may remain on the treated surfaces prior to applying coatings and the like to the treated surfaces. This tends to minimize the hazard to personnel and to reduce the possibility that traces of boron trifluoride adsorbed on the surface being treated may continue to react to the possible detriment of the polymeric structure. Removal may be accomplished after treatment of the surface with the liquid coordination complex of boron trifluoride followed by air by washing the surface with water, acetone, ethyl ether or other suitable volatile organic solvent, followed by air drying or heating the treated surface briefly at a temperature ranging between about 100° C. and 150° C. After treating sequentially with gaseous boron trifluoride and then air or simultaneously with a gaseous mixture thereof, the treated surface may be washed in water followed by drying with air; or the surface may be washed in a dilute aqueous solution of ammonium hydroxide, then in water followed by air drying; or the surface may be heated for a brief period at a temperature ranging between about 100° C. and 150° C. as described previously.

The invention will be more clearly understood by referring to the following examples which illustrate specific embodiments of the invention. The examples should not be considered as limiting the scope of the invention. Unless otherwise indicated, the percentages in the gaseous mixtures are volumetric.

EXAMPLE 1

A web of transparent polyvinyl fluoride film, approximately 5 mils thick and 10 inches wide, was conducted through a rectangular glass-walled treating chamber in a continuous manner. A gaseous mixture composed of 33% boron trifluoride and 67% oxygen was fed continuously into the chamberd from a mixing manifold. The chamber was about 2 feet long and was provided with slits through which the film web entered and left. The speed of film web through the treating chamber was adjusted to provide about 15 seconds' contact with the gaseous mixture. The treatment was accomplished at room temperature, i.e., 20°–25° C.

In the following table, Table I, the surface adherability, the ink-retention and the weatherability properties of the treated polyvinyl fluoride film are compared to those of an untreated control. It will be observed that the described treatment provides outstanding improvements in the adherability and ink-retention of the film with no adverse effect on the weatherability of the film.

*Table I*

PROPERTIES OF TREATED POLYVINYL FLUORIDE FILM

|  | Surface Adherability (grams/inch) | Ink-Retention | Weatherability (hours) |
|---|---|---|---|
| Example 1 | 1,125 | No significant loss of ink. | 1,200 |
| Control | <10 | Stripped and flaked off. | 1,200 |

Surface adherability, in grams/inch, for Examples 1–10 is determined by first cutting samples measuring 10″ x 10″. Each sample is sprayed with a thin layer of a lacquer type adhesive solution of 33% by weight "Hysol" 2040 [1] adhesive in methyl ethyl ketone. For every 14 grams of "Hysol" 2040 adhesive in the solution one gram of "Hysol" Hardener A [2] is added. After allowing the methyl ethyl ketone to evaporate until the resulting adhesive coatings become tacky, a second and third light application of adhesive is applied in the same manner.

Squares, 10″ x 10″, of 8 oz. cotton duck are then given a light spraying with the same adhesive. After allowing the adhesive to dry to a tacky condition, the adhesive-coated sides of the pieces of duck are combined with the adhesive-coated sides of the pieces of film. Each sandwich so made is then subjected to a 20-minute cure in a heated platen press maintained at approximately 110° C., under just sufficient pressure to insure intimate contact. A narrow selvage is left unpressed along one edge of each lamination to provide a means of gripping the plies to separate them. On removal from the platen press, the laminations are allowed to cure for an additional 24 hours at room temperature. Each lamination is then cut into ten 1″ wide strips, each strip having a bit of unlaminated selvage at one end. The plies of each strip are peeled apart by clamping each ply in each of two jaws of an Instron Tensile Testing Instrument, Model No. TT–B. In peeling one ply from another, the rate of jaw separation is approximately 16″ per minute. As the jaws move apart in a vertical direction, the unpeeled tail section of each strip of lamination is allowed to hang down verti-

[1] An epoxy type resin manufactured by Houghton Laboratories, Inc.
[2] An amine type hardener manufactured by Houghton Laboratories, Inc.

cally. This is commonly called a 180 degree peel. The force in grams necessary to peel the plies apart is recorded on a continuously moving chart as the adhesive bond strength in peel. These values are averaged for the samples tested for each film and presented as a measure of the surface adherability.

When determining peeling bond strengths which may exceed the breaking strength of thinner (1 mil) films under tensile loading, the film itself may be reinforced by laminating its free side to an additional layer of the aforementioned 8 oz. cotton duck.

Ink-retention is determined by printing film samples with inks commonly used in the gravure, flexographic and silk screen processes. After the inks have dried thereon, pressure-sensitive adhesive tape is applied to the printed surface of the film samples. The adhesively attached tape is then stripped both slowly and rapidly from the printed surface of the sample and the amount of ink lost thereby is noted. A second test for determining ink-retention comprises folding and crumpling printed film samples and noting whether any ink flakes off the surface.

Weatherability, in hours, is determined by mounting 1" wide samples in an artificial weathering device. In this device, the samples were continuously exposed to intense ultraviolet radiation. At varying intervals, samples were removed and their elongations measured. When the residual elongation of any film sample dropped to about 20%, its weathering exposure was terminated and recorded.

EXAMPLES 2–3

Two film webs were conducted through the apparatus described in Example 1. In Example 2, a transparent polyvinyl fluoride (PVF) film 5 mils thick was used; Example 3, a transparent, oriented polyvinyl fluoride (oPVF) film, 1 mil thick. Orientation of the aforementioned films was accomplished by drawing the films in two mutually perpendicular directions. Example 2 was performed at room temperature. In Example 3, the mixing manifold was equipped with an externally applied wraparound type of electrical resistance heater. The temperature of the gaseous mixture entering the reaction chamber was maintained at a level sufficient to raise the temperature of the polyvinyl fluoride film to approximately 180° C. during its passage through the chamber.

The times of exposure, the composition of the gaseous treating mixture and other conditions of the treatment along with the surface adherability of the treated films compared to controls are given in the following table, Table II.

*Table II*

SUMMARY OF RESULTS FOR EXAMPLES 2–3

| Example | Film | Gas Mixture, %$BF_3$–%$O_2$ | Contact Time (secs.) | Treatment Temp. (° C.) | Surface Adherability (grams/inch) |
| --- | --- | --- | --- | --- | --- |
| 2 | PVF | 98–2 | 5 | 20–25 | 1,200 |
| Control | PVF | (1) | (1) | (1) | 10 |
| 3 | oPVF | 0.1–99.9 | 15 | 180 | 1,160 |
| Control | oPVF | (1) | (1) | (1) | 15 |

[1] No treatment.

EXAMPLES 4–7

Samples of the following films were suspended in stoppered 4-liter Erlenmeyer flasks:

Example 4—Polyvinylidene fluoride ($PVF_2$), 3 mils thick
Example 5—Copolymer of 88 mol percent vinyl fluoride and 12 mol percent vinyl acetate (88 VF/12 VA), 5 mils thick
Example 6—Copolymer of 67 mol percent vinyl fluoride and 33 mol percent vinyl acetate (67 VF/33 VA), 5 mils thick
Example 7—Copolymer of 91 mol percent vinyl fluoride and 9 mol percent isobutylene (91 VF/9 IB), 5 mils thick Moist air had been driven out of the flasks by purging with dry oxygen. Dry boron trifluoride was introduced until the atmohspere was about 98% boron trifluoride and 2% oxygen. The flasks were either allowed to stand at room temperature or they were placed in an oven maintained at elevated temperature. The temperatures of each treatment, the exposure times and the surface adherability of the treated films compared to controls are given in the following table, Table III.

*Table III*

SUMMARY OF RESULTS FOR EXAMPLES 4–7

| Example | Film | Contact Time (minutes) | Treatment Temperature (° C.) | Surface Adherability (grams/inch) |
| --- | --- | --- | --- | --- |
| 4 | $PVF_2$ | 5 | 110 | 1,100 |
| Control | $PVF_2$ | (1) | (1) | <10 |
| 5 | 88VF/12VA | 5 | 20 | 1,470 |
| Control | 88VF/12VA | (1) | (1) | 220 |
| 6 | 67VF/33VA | 5 | 20 | 1,470 |
| Control | 67VF/33VA | (1) | (1) | 760 |
| 7 | 91VF/9IB | 5 | 20 | 1,540 |
| Control | 91VF/9IB | (1) | (1) | 160 |

[1] No treatment.

EXAMPLES 8–9

Polyvinyl fluoride film samples, 1½ mils thick and oriented by drawing the films in two mutually perpendicular directions, were exposed for 15 seconds at room temperature to an atmosphere of 67% boron trifluoride and 33% oxygen in the manner described for Example 1. For Example 8, treated samples were coated with copper; for Example 9, aluminum coatings were used. The metals were deposited as vapor in an evacuated chamber maintained at a pressure of approximately 0.1 micron of mercury. Metallized surfaces of pretreated materials and untreated controls were subjected to the surface adherability tests and the results are given in the following table, Table IV.

*Table IV*

| Example | Metal on Surface | Surface Adherability (grams/inch) |
| --- | --- | --- |
| 8 | Copper | 1,160 |
| Control | do | 70 |
| 9 | Aluminum | 470 |
| Control | do | 170 |

EXAMPLE 10

A polyvinyl fluoride film sample, 1½ mils thick and oriented by drawing in two mutually perpendicular directions, was suspended in a vacuum type desiccator. Moist air was first evacuated from the desiccator and then the desiccator was flushed twice with dry nitrogen. The nitrogen atmosphere was then purged with boron trifluoride until the atmosphere in the desiccator was substantially 100% boron trifluoride. After allowing the film to remain in this atmosphere at room temperature for 20 to 30 seconds, the desiccator was quickly purged with nitrogen; the film sample was removed; and was allowed to hang in air for about 1 minute. The surface adherability of the film sample undergoing this $BF_3$ and air treatment in sequence compared to that of an untreated control is presented in the following table, Table V.

Table V

| Example: | Surface adherability (grams/inch) |
|---|---|
| 10 | 1400 |
| Control | 20 |

EXAMPLE 11

A web of transparent polyvinyl fluoride film, approximately 5 mils thick and 10 inches wide, was exposed for 15 seconds to an atmosphere comprising a mixture of 33% boron trifluoride and 67% oxygen in the manner described for Example 1. Prior to exposure to this atmosphere, one side of the web had been covered completely with overlapping strips of pressure-sensitive adhesive tape having a polyethylene terephthalate film base. After exposure to the gaseous mixture, the film left the chamber and the pressure-sensitive adhesive tape was stripped therefrom.

The single treated surface of the polyvinyl fluoride film was then roller coated with a relatively thin (approximately 12% solids) solution of a normally tacky and pressure-sensitive type adhesive in benzene. This adhesive solution was prepared following the formula and method described in Example E of U.S. Patent No. 2,177,627 which issued October 31, 1939, to R. G. Drew. The solution consisted essentially of a blend of approximately 200 parts of wood rosin, 250 parts of thin latex crepe rubber and 2.5 parts of betanaphthol, dissolved in approximately 3,250 parts of benzene. The benzene was evaporated from this adhesive coating in a current of warm air leaving an essentially transparent adhesive-coated polyvinyl fluoride film.

The adhesive surface was tested by pressing it against and subsequently stripping it from various surfaces. It was found that the film adhered to and stripped free from the surfaces against which it was pressed in the manner exhibited by currently marketed pressure-sensitive adhesive tapes without delamination or offsetting of the adhesive material.

The adhesive-coated polyvinyl fluoride film was rolled up convolutely on a one-inch diameter wooden core, with the adhesive-coated surface on the inside of the convolutions. This placed the untreated surface of the polyvinyl fluoride film in intimate adhesive contact with the adhesive-coated treated surface of this film. The film was subsequently unwound without delamination of the adhesive coating or offsetting of this coating onto the untreated surface of the polyvinyl fluoride film.

EXAMPLES 12–29

Samples of the following eighteen 2-mil thick fluorocarbon polymer films were treated:

Example 12—Oriented polyvinyl fluoride (oPVF)

Example 13—White, opaque, oriented polyvinyl fluoride film containing 15% rutile $TiO_2$ by weight, based on the combined weight of polymer plus pigment (owPVF)

Example 14—Green, opaque, oriented polyvinyl fluoride film containing 15% total pigment by weight, based on the combined weight of polymer plus pigment, the pigment portion consisting of about 94% rutile $TiO_2$, 3% chrome yellow, 2% lampblack and 1% Monastral green (ogPVF)

Example 15—Copolymer of 89.5 mol percent vinyl fluoride and 10.5 mol percent vinylidene fluoride (89.5 VF/10.5 $VF_2$)

Example 16—Copolymer of 92 mol percent vinyl fluoride and 8 mol percent vinyl acetate (92 VF/8 VA)

Example 17—Copolymer of 93.5 mol percent vinyl fluoride and 6.5 mol percent vinyl pivalate (93.5 VF/6.5 VPiv)

Example 18—Copolymer of 93 mol percent vinyl fluoride and 7 mol percent vinyl propionate (93 VF/7 VPr)

Example 19—Copolymer of 94 mol percent vinyl fluoride and 6 mol percent vinyl butyrate (94 VF/6 VBu)

Example 20—Copolymer of 95.9 mol percent vinylidene fluoride and 4.1 mol percent vinyl pivalate (95.9 $VF_2$/4.1 VPiv)

Example 21—Copolymer of 92.5 mol percent vinyl fluoride and 7.5 mol percent tetrafluoroethylene (92.5 VF/7.5 TFE)

Example 22—Copolymer of 83.5 mol percent vinyl fluoride and 16.5 mol percent tetrafluoroethylene (83.5 VF/16.5 TFE)

Example 23—Copolymer of 94.9 mol percent vinyl fluoride and 5.1 mol percent hexafluoropropylene (94.9 VF/5.1 HFP)

Example 24—Copolymer of 89.8 mol percent vinylidene fluoride and 10.2 mol percent tetrafluoroethylene (89.8 $VF_2$/10.2 TFE)

Example 25—Copolymer of 95.4 mol percent vinylidene fluoride and 4.6 mol percent hexafluoropropylene (95.4 $VF_2$/4.6 HFP)

Example 26—Copolymer of 77.8 mol percent vinylidene fluoride and 22.2 mol percent hexafluoropropylene (77.8 $VFG_2$/22.2 HFP)

Example 27—Interpolymer of 61 mol percent vinylidene fluoride, 21.7 mol percent tetrafluoroethylene and 17.3 mol percent hexafluoropropylene (61 $VF_2$/21.7 TFE/17.3 HFP)

Example 28—Copolymer of 50 mol percent tetrafluoroethylene and 50 mol percent ethylene (50 TFE/50 E)

Example 29—Copolymer of 14.7 mol percent vinyl fluoride and 85.3 mol percent ethylene (14.7 VF/85.3 E).

The treatment comprised conducting each film through a rectangular stainless steel-lined chamber in a continuous manner at a speed which exposed the film for about 60 seconds to a boron trifluoride/air mixture in the chamber. The concentration of boron trifluoride in the chamber ranged from 3% to about 12% by volume. Temperatures within the chamber ranged from about 23° C. to about 38° C. After leaving the treating chamber, each film was passed briefly through a dip tank containing a 6% aqueous solution of ammonium hydroxide. The film was then washed in a water spray and dried in air.

Surface adherability, in grams/inch, for Examples 12–34 was determined by first preparing laminations according to the following procedure. An adhesive was prepared by blending 10 parts of epoxy resin Epon 828 and 3 parts of Epon Curing Agent U (products of the Shell Chemical Co.). This blend was diluted with methyl ethyl ketone to a consistency suitable for spraying, i.e. to about a 20% solids solution. This solution was then sprayed on Masonite boards to a wet thickness sufficient to produce a dried thickness of about 1.5 mils, followed by heating the adhesive-coated boards for 3 minutes at 50° C. in a circulating air oven to remove solvent. A sample of each treated film and of each corresponding untreated control film was then placed on this adhesive-coated surface and the lamination completed by pressing the sandwich thus formed for 10 minutes at 160° C. under a pressure of about 200 p.s.i. Along one edge of each lamination a narrow selvage was left uncombined by interposing between the fluorocarbon film and the adhesive layer a strip of polytetrafluoroethylene tape. This provided a means of gripping the plies to separate them in evaluating the surface adherability of the fluorocarbon film. This evaluation was accomplished by cutting several 1-inch wide strips of the lamination from each sample, gripping the Masonite in the upper jaw of a Suter Tester with the film selvage gripped in the lower jaw of the tester. During a peel test, the lower jaw moved downward at the rate of 10 inches per minute so that the "tail" of film formed an angle of 90 degrees with the Masonite board from which it was being removed.

The surface adherability of the treated films of Examples 12-29 compared to untreated controls is presented in the following table, Table VI.

Table VI
SUMMARY OF RESULTS FOR EXAMPLES 12-29

| Example | Film | Surface Adherability (grams/inch) | |
|---|---|---|---|
| | | Control | Treated |
| 12 | oPVF | 0 | (1) |
| 13 | owPVF | 0 | (1) |
| 14 | ogPVF | 0 | (1) |
| 15 | 89.5 VF/10.5 VF$_2$ | 0 | 2,700 |
| 16 | 92 VF/8 VA | 0 | (1) |
| 17 | 93.5 VF/6.5 VPiv | 2,400 | 3,800 |
| 18 | 93 VF/7 VPr | 0 | (1) |
| 19 | 94 VF/6 VBu | 0 | (1) |
| 20 | 95.9 VF$_2$/4.1 VPiv | 0 | (1) |
| 21 | 92.5 VF/7.5 TFE | 0 | (1) |
| 22 | 83.5 VF/16.5 TFE | 0 | (1) |
| 23 | 94.9 VF/5.1 HFP | 0 | (1) |
| 24 | 89.8 VF$_2$/10.2 TFE | 120 | 2,700 |
| 25 | 95.4 VF$_2$/4.6 HFP | 0 | 1,200 |
| 26 | 77.8 VF$_2$/22.2 HFP | 1,800 | 2,100 |
| 27 | 61 VF$_2$/21.7 TFE/17.3 HFP | 1,200 | 1,500 |
| 28 | 50 TFE/50 E | 0 | 3,000 |
| 29 | 14.7 VF/85.3 E | 0 | 120 |

[1] The film was so firmly bonded to the Masonite board that before peeling could be started, the film failed under tensile loading.

EAMPLES 30-34

The procedure described for the previous Examples 12-29 was repeated using polyvinylidene fluoride film samples, 2 mils thick. The times of exposure to the boron trifluoride/air mixture varied from 60 seconds for Example 30 to 10 minutes for Example 34. In the following table, Table VII, the exposure times and the surface adherabilities are shown for these examples compared to a control film that did not undergo the boron trifluoride/air treatment.

Table VII
SUMMARY OF RESULTS FOR EXAMPLES 30-34

| Example | Exposure time (minutes) | Surface adherability (grams/inch) |
|---|---|---|
| 30 | 1 | 200 |
| 31 | 2 | 1,000 |
| 32 | 3 | 1,600 |
| 33 | 5 | 1,800 |
| 34 | 10 | 2,400 |
| Control | 0 | 0 |

EXAMPLES 35-36

One sample of the oriented polyvinyl fluoride film of Example 12 (oPVF) was immersed in a boron trifluoridediethyl etherate complex[1] at 22° C. for 10 seconds in Example 35. For Example 36, a second sample was immersed in the same complex at 85° C. for 1 second.

The treated films and untreated control were each coated on one surface with a solution prepared by mixing 100 parts of a 15% solution in 1,1,2-trichloroethane of a copolyester of ethylene glycol and dimethyl terephthalate/dimethyl sebacate with 2.5 parts of a 60% solution in methyl isobutyl ketone of the reaction product of 4 mols of 2,4-toluene diisocyanate and 1 mol of 2,6-toluene diisocyanate with 2 mols of trimethylolpropane to a thickness sufficient to produce a dried film about 10 mils thick. An uncoated selvage was left along one edge. The coated samples were air dried for 2½ hours and the polyester coating cured by heating for ½ hour at 145° C. The surface adherability of the treated and control films was checked by peeling the polyester coating therefrom in a Suter Tester. The results of these tests are shown in Table VIII.

[1] Sold as "Boron Trifluoride, Ether Complex, Technical; BF$_3$·(C$_2$H$_5$)$_2$O" by Baker and Adamson Products, General Chemical Division, Allied Chemical and Dye Corp.

Table VIII
SUMMARY OF RESULTS FOR EXAMPLES 35-36

| Example | Film | Surface adherability (grams/inch) |
|---|---|---|
| 35 | oPVF | 2,350 |
| 36 | oPVF | 2,300 |
| Control | oPVF | 1,200 |

EXAMPLES 37-38

One sample of the white oriented polyvinyl fluoride film of Example 13 (owPVF) was immersed in a boron trifluoride-diethyl etherate complex at 22° C. for 10 seconds in Example 37. For Example 38, a second sample was immersed in the same complex at 85° C. for 1 second.

The treated films and an untreated control were each laminated to a piece of cement-asbestos board siding according to the following procedure:

A piece of cement-asbestos board siding, siding A, was immersed in 20% aqueous sulfuric acid for 10 seconds at 75° C., washed in hot water, then washed in cold water and air dried. A second piece of cement-asbestos board siding, siding B, was immersed for 10 seconds in an aqueous 10% zinc chloride/15% phosphoric acid solution at room temperature, washed in hot water, then washed in cold water and air dried. A third piece of cement-asbestos board siding, siding control, was subjected to the same treatment as was used for siding B.

A 4-mil thick wet coating of an adhesive consisting of a 30% solution of a 97.8% methyl methacrylate/2.2% ammoniated glycidyl methacrylate copolymer in a solvent mixture of about 3 parts of isopropanol with 7 parts of toluene was applied to one surface of each piece of siding, then air dried to volatilize the solvent therefrom. Treated films of Examples 37 and 38 and the control film were placed on top of the adhesive coatings of sidings A, B, and the control, respectively, and pressed for 10 minutes under a pressure of 150 p.s.i. in a platen press maintained at 180° C.

To simulate the hydrolytic attack of outdoor weathering exposures, the laminations were subjected to accelerated testing by immersion in boiling tap water, being tested for bond durability at regular intervals by attempting to peel apart the plies of the laminations. The results of these tests are shown in Table IX.

Table IX
SUMMARY OF RESULTS FOR EXAMPLES 37-38

| Example | Film | Time in Boiling Water to Failure by Delamination |
|---|---|---|
| 37 | owPVF | 102 hours. |
| 38 | owPVF | 125 hours. |
| Control | owPVF | 0.5 hour. |

The treatment is most conveniently performed in a chamber suitable for confining gases, vapors or mixtures thereof for the gaseous treatment or a chamber suitable for confining a liquid when a liquid coordination complex or hydrate of boron trifluoride is used and which permit the continuous introduction and removal of a running web of film. Since boron trifluoride is extremely corrosive, especially in the presence of water vapor, selection of materials for constructing the chamber is critical. Reaction chambers made of metal and lined with a vitrified coating of glass, a sprayed-on coating of "Teflon"[1]

[1] Manufactured by E. I. du Pont de Nemours and Company.

polytetrafluoroethylene resin or a film of "Teflon" or of the copolymer of tetrafluoroethylene and hexafluoropropylene are quite suitable for use in the process of this invention. The reaction chamber may be designed so that either one or both surfaces of the film is treated during a single pass of the film through the chamber.

As stated previously, room temperatures, i.e. 20–25° C., are quite adequate for the successful treatment of most of the organic fluorocarbon polymeric, thermoplastic films. However, for economic reasons it is frequently advantageous to carry out the process of the invention employing higher concentrations of boron trifluoride and/or higher temperatures in order to reduce the time of contact. When liquid coordination complexes or hydrates of boron trifluoride are employed, heat may be supplied either by preheating the film, or by providing the treatment vessel with immersion heaters or suitable jacketing. When gaseous boron trifluoride is employed, either the film, the boron trifluoride or the air may be preheated before entering the treatment chamber, or the chamber may be equipped with suitably placed radiant heaters.

The treatment of the invention is quick, efficient and economical. It provides a substantial improvement in the adherability of organic, polymeric, thermoplastic, fluorocarbon films to themselves, to metal sheets and to inks employed in printing and decorating, without impairing the important properties of the films such as their resistance to degradation upon exposure to outdoor weathering. Adhesion of films to metallic coatings deposited by vacuum evaporation techniques is also improved. In the case of metallizing oriented polyvinyl fluoride film, where electrical discharge and flame treatment provide erratic and entirely unsatisfactory results when adhering metal to film, the treatment of the present invention is surprisingly effective in providing a very adherable base for the metallic coating. Of particular advantage is that the treatment of the present invention is effective even when the surface of the base film is contaminated with dust, greases, oils, etc. The treatment is also effective with film containing fillers, pigments, phosphors, stabilizers, dyes, finely-divided metals, ultraviolet light-absorbing compounds, etc.

The materials produced by the process of this invention are sufficiently adherable to adhesives to permit the manufacture of laminates of all types. Such laminates, particularly with polyvinyl fluoride film, may be employed advantageously as exterior siding, sheathing, roofing materials for houses and other buildings, interior panels for walls, ceilings and floors, outdoor furniture, outdoor signs, interior furniture of various descriptions, especially where protection from spilled liquids is desired; boat hulls, insulating panels, trailer cars, permanent awnings, forms for concrete, counter tops, doors, window frames, duct work, containers for storage and shipment of corrosive materials, Venetian blinds and certain parts of airplane structures.

This application is a continuation-in-part of copending application Serial No. 700,953, filed December 6, 1957, now abandoned.

Having fully disclosed the invention, what is claimed is:

1. A process for treating an organic, polymeric, thermoplastic shaped structure of a fluorocarbon polymer containing at least 5 mole percent of recurring structural units having the formula:

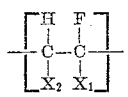

wherein:
—$X_1$ is a monovalent radical selected from the group consisting of —H, —F, —Cl and —$CF_3$; and
—$X_2$ is a monovalent radical selected from the group consisting of —H, —F, —$R_1$ and —$R_2$, wherein —$R_1$ is selected from the group consisting of aryl and alkyl having 1 to 8 carbon atoms and —$R_2$ is selected from the group consisting of —O—$R_1$, —$CH_2$—O—$R_1$,

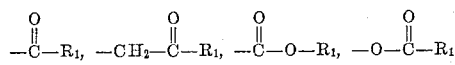

and

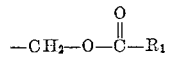

which comprises contacting a surface of said structure of said fluorocarbon polymer with an amount of boron trifluoride and oxygen sufficient to improve the surface adherability of said structure.

2. A process for treating an organic, polymeric, thermoplastic film of a fluorocarbon polymer containing at least 5 mole percent of recurring structural units having the formula:

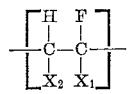

wherein
—$X_1$ is a monovalent radical selected from the group consisting of —H, —F, —Cl and —$CF_3$; and
—$X_2$ is a monovalent radical selected from the group consisting of —H, —F, —$R_1$ and —$R_2$, wherein —$R_1$ is selected from the group consisting of aryl and alkyl having 1 to 8 carbon atoms and —$R_2$ is selected from the group consisting of —O—$R_1$, —$CH_2$—O—$R_1$,

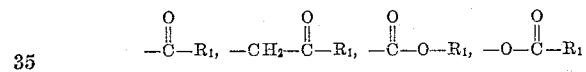

and

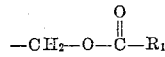

which comprises contacting a surface of said film of said fluorocarbon polymer with an amount of boron trifluoride and oxygen sufficient to improve the surface adherability of said film.

3. A process as in claim 2 wherein said organic, polymeric, thermoplastic film is polyvinylidene fluoride film.

4. A process as in claim 2 wherein said organic, polymeric, thermoplastic film is polyvinyl fluoride film.

5. A process as in claim 2 wherein said organic, polymeric, thermoplastic film is vinyl fluoride/vinyl acetate copolymer film.

6. A process as in claim 2 wherein said organic, polymeric, thermoplastic film is vinyl fluoride/isobutylene copolymer film.

7. A process as in claim 2 wherein said organic polymeric, thermoplastic film is vinyl fluoride/tetrafluoroethylene copolymer film.

8. A process as in claim 2 wherein said organic, polymeric, thermoplastic film is tetrafluoroethylene/ethylene copolymer film.

9. A process as in claim 2 wherein said organic, polymeric, thermoplastic film is vinylidene fluoride/hexafluoropropylene copolymer film.

10. A process as in claim 2 wherein said organic, polymeric, thermoplastic film is vinylidene fluoride/tetrafluoroethylene copolymer film.

11. A process as in claim 2 wherein said organic, polymeric, thermoplastic film is vinyl fluoride/vinyl butyrate copolymer film.

12. A process as in claim 2 wherein said organic, polymeric, thermoplastic film is vinyl fluoride/vinyl pivalate copolymer film.

13. A process as in claim 2 wherein the oxygen is supplied from air.

14. A process as in claim 2 wherein said treatment comprises contacting said film with a gaseous mixture of boron trifluoride and oxygen, the boron trifluoride comprising 0.1–98% by volume and the oxygen comprising at least 2% by volume of the gaseous mixture.

15. A process as in claim 2 wherein said treatment comprises first treating with boron trifluoride and immediately thereafter treating with oxygen.

16. A process as in claim 2 wherein said treatment comprises first treating with boron trifluoride and immediately thereafter treating with air.

17. A process as in claim 2 wherein said treatment comprises first treating with an organic coordination complex of boron trifluoride and immediately thereafter treating with oxygen.

18. A process as in claim 2 wherein said treatment comprises first treating with an organic coordination complex of boron trifluoride and immediately thereafter treating with air.

19. A process as in claim 18 wherein said organic coordination complex is a boron trifluoride-diethyl etherate complex.

20. A process as in claim 2 wherein said treatment comprises first treating with a liquid hydrate of boron trifluoride and immediately thereafter treating with oxygen.

References Cited in the file of this patent

UNITED STATES PATENTS

| 2,898,229 | Herr et al. | Aug. 4, 1959 |
| 2,946,710 | Fields | July 26, 1960 |

FOREIGN PATENTS

| 919,665 | Germany | Nov. 2, 1954 |